(No Model.)
C. A. WYMAN.
GATE.
No. 267,765. Patented Nov. 21, 1882.
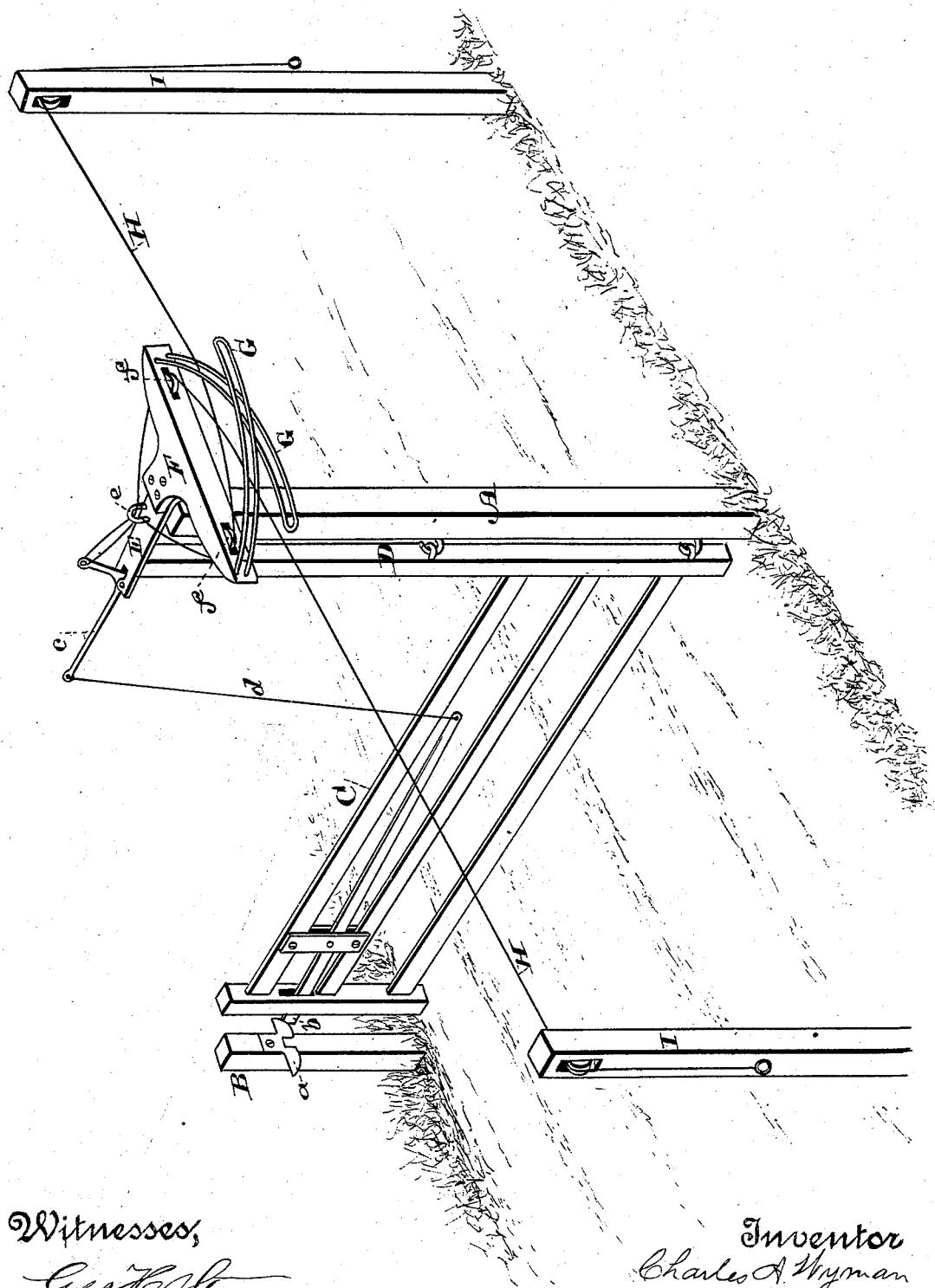
Witnesses,
Geo H Strong.
J H Krouse
Inventor
Charles A Wyman
By Dewey & Co.
Attorneys

UNITED STATES PATENT OFFICE.

CHARLES A. WYMAN, OF SAN JOSÉ, CALIFORNIA.

GATE.

SPECIFICATION forming part of Letters Patent No. 267,765, dated November 21, 1882.

Application filed September 18, 1882. (No model.)

*To all whom it may concern:*

Be it known that I, CHARLES A. WYMAN, of San José, county of Santa Clara, State of California, have invented an Improved Gate; and I hereby declare the following to be a full, clear, and exact description thereof.

My invention relates to the class of gates, and more especially to those which are intended to be opened by the passer-through without having to alight from his conveyance.

My invention consists in the arrangement of cords and levers hereinafter described when applied to a swinging gate, whereby it may be unlatched and swung open by power applied to the cords hung conveniently within reach.

The object of my invention is to provide such an arrangement of devices for opening gates as shall be operated with the greatest ease and to the best advantage.

The accompanying drawing shows a view of my device.

Let A represent a post to which the gate is hinged, and B the post to which it swings and latches.

C is the gate, the inner post, D, of which is hung and suitably hinged to the main post A, whereby said gate is adapted to swing readily to either side. Upon top of this post is horizontal plate E, which extends over and clears the main post A. Upon its outer end is a horizontal lever, F, set at right angles with it and extending to each side. Upon the back of this lever are slotted curved guides G, as shown.

Upon the post B is a catch, *a*, adapted to receive in its notch the end of a latch pressed up from below. This latch is marked *b*, and is pivoted to the gate in such manner as to have a long arm, the gravitation of which in its normal position is sufficient to raise and hold its other end in the catch *a*.

Upon the inner end of the top plate, E, is hinged by its center or bend an elbow-lever, *c*, the lower arm of which is connected with the long arm of the latch *b* by a cord, *d*.

H represents the cords by which the gate is opened. These have their inner ends attached to the upper arm of the elbow-lever *c*. Thence they pass through a guide, *e*, or a pulley, and diverge, passing in opposite directions over pulleys *f* in the ends of the lever F. Thence they return, each through a guide, G, and passing each other extend in opposite directions to posts I upon the side of the road, from which posts they hang within convenient reach.

The operation of the gate is as follows: Suppose it to be closed. A horseman approaching takes hold, without dismounting, of the end of rope H and pulls upon it. The power is exerted at once upon the elbow-lever *c*, the lower arm of which rising lifts the latch *b*, to release its end from catch *a*. The gate being released is free to yield to the leverage upon the farther end of lever F, and swings open away from the horseman. After having passed through he pulls upon the other rope H and closes the gate.

By exerting proper strength, the gate may be either swung through a quarter-circle to close it, or may be turned through the half-circle from either side.

It is obvious that by attaching cords to the ends of cords H and suitably guiding them behind the main post A, each to the opposite post I, I can open and close the gate from one side, and also adapt it to open and close one way only.

Although I have described a latching device, I do not confine myself to this form. Any device suitably arranged to be operated by the elbow-lever would answer the purpose.

The object I have in placing the lever F on top of the posts is to keep it clear of them, to allow it full swing; and the advantage of the slotted guides G is that they keep the cords from interfering, and properly direct and swing them. Without them they would have no support in extending behind the lever, and would be liable to get out of order.

Having thus described my invention, what I claim as new, and desire to secure by Letters Patent, is—

1. The stationary gate-post A and swinging gate C, hinged thereto, in combination with the means for swinging said gate, consisting of the horizontal top plate, E, secured to the inner post, D, of the gate, and passing over the top of post A, the horizontal lever F at right angles upon said beam, the slotted curved guides G upon the back of the lever, and cords H, passing through slotted guides G, and attached to the upper arm of the elbow-lever c, substantially as herein described.

2. The swinging gate C, having a latching device securing it to the gate-post, in combination with the means for unlatching and swinging the gate at the same time, consisting of the top plate, E, cross-lever F, slotted curved guides G, and cords H, and the elbow-lever c, hinged to the top plate, E, and connected with the latching device and the operating-cords H, all arranged and operating substantially as herein described.

In witness whereof I hereunto set my hand.

CHARLES A. WYMAN.

Witnesses:
JACKSON LEWIS,
S. A. CLARK.